United States Patent
Matus et al.

(10) Patent No.: US 10,304,329 B2
(45) Date of Patent: May 28, 2019

(54) METHOD AND SYSTEM FOR DETERMINING TRAFFIC-RELATED CHARACTERISTICS

(71) Applicant: Zendrive, Inc., San Francisco, CA (US)

(72) Inventors: Jonathan A. Matus, San Francisco, CA (US); Pankaj Risbood, San Francisco, CA (US)

(73) Assignee: Zendrive, Inc., San Francisco, CA (US)

( * ) Notice: Subject to any disclaimer, the term of this patent is extended or adjusted under 35 U.S.C. 154(b) by 0 days.

(21) Appl. No.: 16/022,184

(22) Filed: Jun. 28, 2018

(65) Prior Publication Data
US 2019/0005812 A1 Jan. 3, 2019

Related U.S. Application Data

(60) Provisional application No. 62/526,113, filed on Jun. 28, 2017.

(51) Int. Cl.
G08G 1/00 (2006.01)
G08G 1/16 (2006.01)
(Continued)

(52) U.S. Cl.
CPC ....... *G08G 1/0133* (2013.01); *G06K 9/00825* (2013.01); *G08G 1/0112* (2013.01);
(Continued)

(58) Field of Classification Search
CPC ...... G08G 1/16; G08G 1/0133; G08G 1/0112; G08G 1/0129; G08G 1/0967; H04W 4/00; H04W 4/027; G06K 9/00; G06K 9/00825
See application file for complete search history.

(56) References Cited

U.S. PATENT DOCUMENTS

| 6,049,778 A | 4/2000 | Walker et al. |
| 7,801,675 B2 | 9/2010 | Currie et al. |

(Continued)

FOREIGN PATENT DOCUMENTS

| DE | 3439000 A1 | 4/1986 |
| DE | 102008008555 | 8/2008 |

(Continued)

OTHER PUBLICATIONS

Giuseppe, Guido et al., "Using Smartphones as a Tool to Capture Road Traffic Attributes", University of Calabria, Department of Civil Engineering, via P.Bucci, 87036—Rende (CS) Italy, Applied Mechanics and Materials, vol. 432 (2013, Trans Tech Publications, Switzerland, pp. 513-519.

(Continued)

*Primary Examiner* — Yonel Beaulieu
(74) *Attorney, Agent, or Firm* — Jeffrey Schox; Keith Loebner

(57) ABSTRACT

A method for traffic characterization associated with a vehicle including collecting a movement dataset sampled at least at one of a location sensor and a motion sensor associated with the vehicle, during a driving session associated with movement of the vehicle; extracting a set of features from the movement dataset associated with movement of the vehicle during the driving session; and determining one or more traffic-related characteristics associated with the vehicle based on the set of features.

20 Claims, 5 Drawing Sheets

(51) Int. Cl.
| | |
|---|---|
| *H04W 4/00* | (2018.01) |
| *H04W 40/10* | (2009.01) |
| *H04W 40/04* | (2009.01) |
| *G08G 1/01* | (2006.01) |
| *G06K 9/00* | (2006.01) |
| *G08G 1/0967* | (2006.01) |
| *H04W 4/02* | (2018.01) |

(52) U.S. Cl.
CPC ......... *G08G 1/0129* (2013.01); *G08G 1/0967* (2013.01); *H04W 4/027* (2013.01)

(56) References Cited

U.S. PATENT DOCUMENTS

| | | | |
|---|---|---|---|
| 8,264,375 | B2 | 9/2012 | Devries |
| 8,489,330 | B2* | 7/2013 | Ellanti .................. G01C 21/26 701/451 |
| 8,504,035 | B2 | 8/2013 | Shin et al. |
| 8,996,234 | B1 | 3/2015 | Tamari et al. |
| 9,368,027 | B2 | 6/2016 | Jang et al. |
| 9,467,515 | B1* | 10/2016 | Penilla .................. G06Q 20/18 |
| 9,495,601 | B2 | 11/2016 | Hansen |
| 9,536,428 | B1* | 1/2017 | Wasserman ........ G06Q 30/0265 |
| 9,773,281 | B1* | 9/2017 | Hanson .................. G06Q 40/08 |
| 9,854,396 | B2 | 12/2017 | Himmelreich et al. |
| 2005/0080555 | A1 | 4/2005 | Parupudi et al. |
| 2005/0093868 | A1 | 5/2005 | Hinckley |
| 2005/0197773 | A1 | 9/2005 | Brewster et al. |
| 2007/0208494 | A1 | 9/2007 | Chapman et al. |
| 2008/0033776 | A1 | 2/2008 | Marchese |
| 2008/0103907 | A1 | 5/2008 | Maislos et al. |
| 2008/0243439 | A1 | 10/2008 | Runkle et al. |
| 2008/0312832 | A1 | 12/2008 | Greene et al. |
| 2010/0056175 | A1 | 3/2010 | Bachmann et al. |
| 2010/0100398 | A1 | 4/2010 | Auker et al. |
| 2010/0106406 | A1 | 4/2010 | Hille et al. |
| 2010/0273508 | A1 | 10/2010 | Parata et al. |
| 2011/0124311 | A1 | 5/2011 | Staehlin |
| 2011/0246156 | A1 | 10/2011 | Zecha et al. |
| 2012/0066053 | A1 | 3/2012 | Agarwal |
| 2012/0089328 | A1* | 4/2012 | Ellanti .................. G01C 21/26 701/425 |
| 2012/0149400 | A1 | 6/2012 | Paek et al. |
| 2012/0245963 | A1 | 9/2012 | Peak et al. |
| 2013/0052614 | A1 | 2/2013 | Mollicone et al. |
| 2013/0096731 | A1 | 4/2013 | Tamari et al. |
| 2013/0130639 | A1 | 5/2013 | Oesterling et al. |
| 2013/0302758 | A1 | 11/2013 | Wright |
| 2013/0317860 | A1 | 11/2013 | Schumann |
| 2013/0325517 | A1 | 12/2013 | Berg |
| 2013/0332357 | A1 | 12/2013 | Green et al. |
| 2014/0038640 | A1 | 2/2014 | Wesselius et al. |
| 2014/0046896 | A1 | 2/2014 | Potter |
| 2014/0081670 | A1 | 3/2014 | Lim et al. |
| 2014/0188638 | A1 | 7/2014 | Jones et al. |
| 2014/0197967 | A1 | 7/2014 | Modica et al. |
| 2014/0232592 | A1 | 8/2014 | Psiaki et al. |
| 2014/0244150 | A1 | 8/2014 | Boesch et al. |
| 2014/0244156 | A1 | 8/2014 | Magnusson et al. |
| 2014/0288765 | A1 | 9/2014 | Elwart et al. |
| 2014/0288828 | A1 | 9/2014 | Werner et al. |
| 2015/0229666 | A1 | 8/2015 | Foster et al. |
| 2015/0246654 | A1 | 9/2015 | Tadic et al. |
| 2015/0327034 | A1 | 11/2015 | Abramson et al. |
| 2015/0334545 | A1 | 11/2015 | Maier et al. |
| 2016/0033366 | A1 | 2/2016 | Liu et al. |
| 2016/0059855 | A1 | 3/2016 | Rebhan et al. |
| 2016/0068156 | A1 | 3/2016 | Horii |
| 2016/0086285 | A1 | 3/2016 | Jordan et al. |
| 2016/0171521 | A1* | 6/2016 | Ramirez ............ G06Q 30/0224 701/409 |
| 2016/0174049 | A1 | 6/2016 | Levy et al. |
| 2016/0189442 | A1 | 6/2016 | Wright |
| 2016/0232785 | A1* | 8/2016 | Wang ..................... G08G 1/012 |
| 2016/0269852 | A1 | 9/2016 | Meyers et al. |
| 2016/0272140 | A1 | 9/2016 | Kim et al. |
| 2016/0379310 | A1* | 12/2016 | Madigan ................ G06Q 40/08 705/4 |
| 2016/0379485 | A1 | 12/2016 | Anastassov et al. |
| 2016/0381505 | A1 | 12/2016 | Sankaran |
| 2017/0053461 | A1 | 2/2017 | Pal et al. |
| 2017/0097243 | A1* | 4/2017 | Ricci ....................... H04W 4/21 |
| 2017/0126810 | A1 | 5/2017 | Kentley et al. |
| 2017/0234689 | A1 | 8/2017 | Gibson et al. |
| 2017/0371608 | A1* | 12/2017 | Wasserman ............... G06F 3/14 |
| 2018/0174446 | A1* | 6/2018 | Wang .................... G08G 1/0133 |

FOREIGN PATENT DOCUMENTS

| | | |
|---|---|---|
| EP | 0534892 A1 | 3/1993 |
| GB | 2492369 B | 4/2014 |
| KR | 20130106106 A | 9/2013 |
| WO | 085220 | 10/2004 |

OTHER PUBLICATIONS

Kalra, Nidhi, "Analyzing Driving and Road Events via Smartphone", International Journal of Computer Applications (0975-8887), vol. 98—No. 12, Jul. 2014, pp. 5-9.

Mohan, Prashanth et al., "Nericell: Rich Monitoring of Road and Traffic Conditions using Mobile Smartphones", Microsoft Research India, SenSys '08, Nov. 5-7, 2008, Raleigh North Carolina, USA, 14 pages.

International Search Report and Written Opinion for PCT Application No. PCT/US2017/051218 dated Nov. 17, 2018.

"Das Tathagata; et al."PRISM: Platform for Remote Sensing using Smartphones," In. Proc. Mobisys '10, Jun. 15-18, 2010, San Francisco, USA, pp. 63-76.", Jan. 2, 2018 00:00:00.0.

European Patent Office Search Report for Application No. 16837957. 6, dated Sep. 7, 2018.

\* cited by examiner

METHOD AND SYSTEM FOR DETERMINING TRAFFIC-RELATED CHARACTERISTICS

CROSS-REFERENCE TO RELATED APPLICATIONS

This application claims the benefit of U.S. Provisional Application No. 62/526,113, filed 28 Jun. 2017, which is incorporated herein in its entirety by this reference. This application is related to U.S. application Ser. No. 15/727,972, filed 9 Oct. 2017, now U.S. Pat. No. 10,137,889 which is a continuation of U.S. application Ser. No. 15/243,565, filed Aug. 22, 2016, now U.S. Pat. No. 9,818,239. which is incorporated herein in its entirety by this reference.

TECHNICAL FIELD

This invention relates generally to the vehicle monitoring field, and more specifically to a new and useful method and system for determining traffic-related characteristics associated with one or more vehicles.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
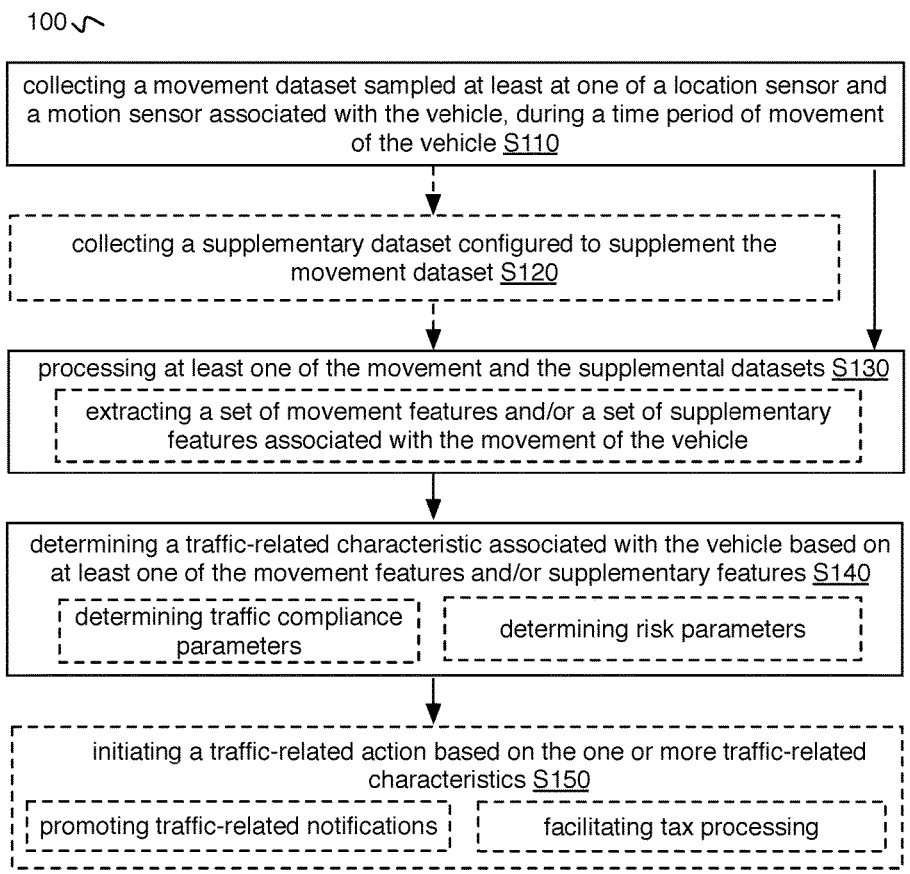
FIG. 1 is a flowchart representation of an embodiment of a method.
Figure 2:
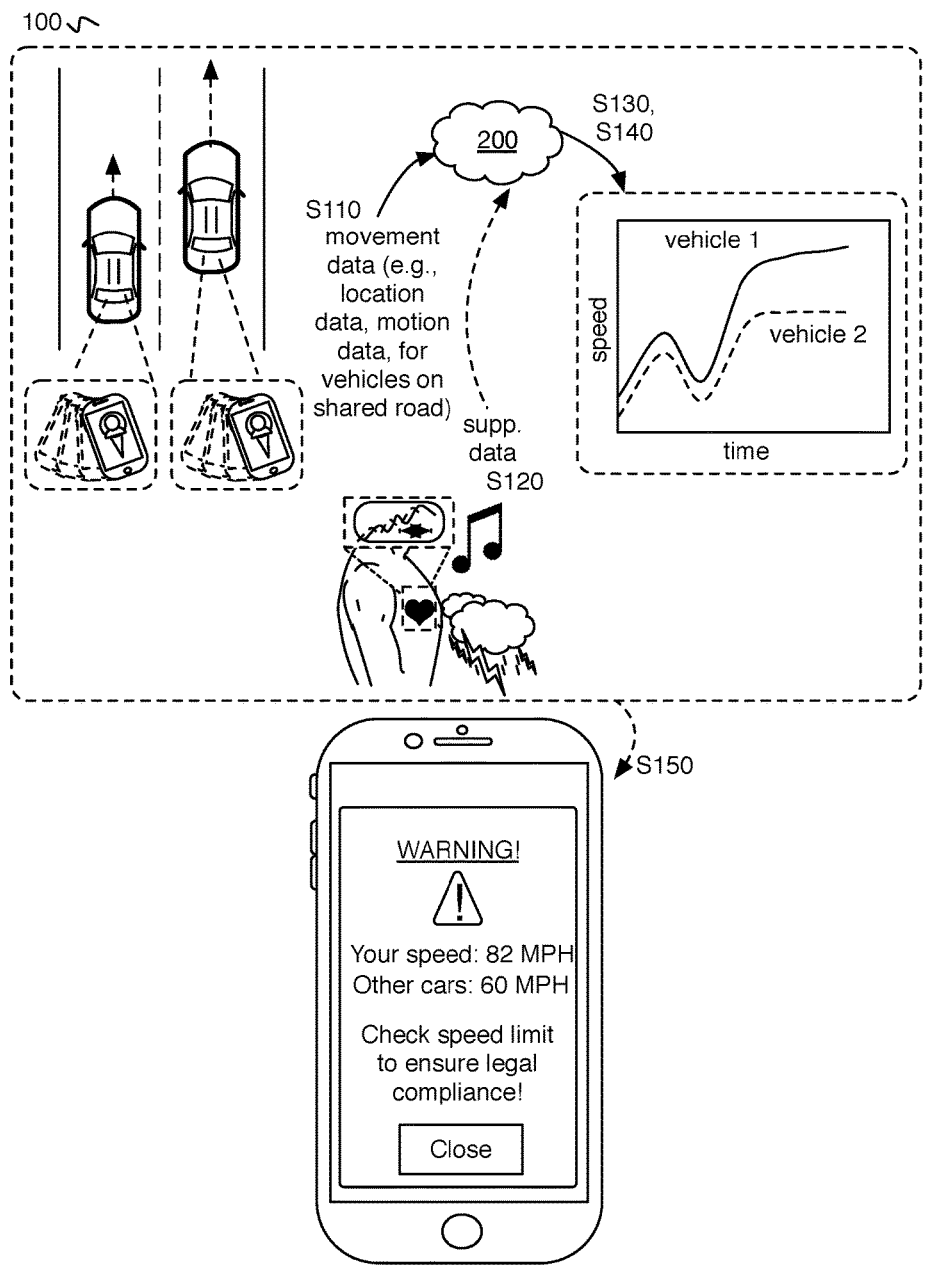
FIG. 2 is a graphical representation of a variation of an embodiment of the method.
Figure 3:
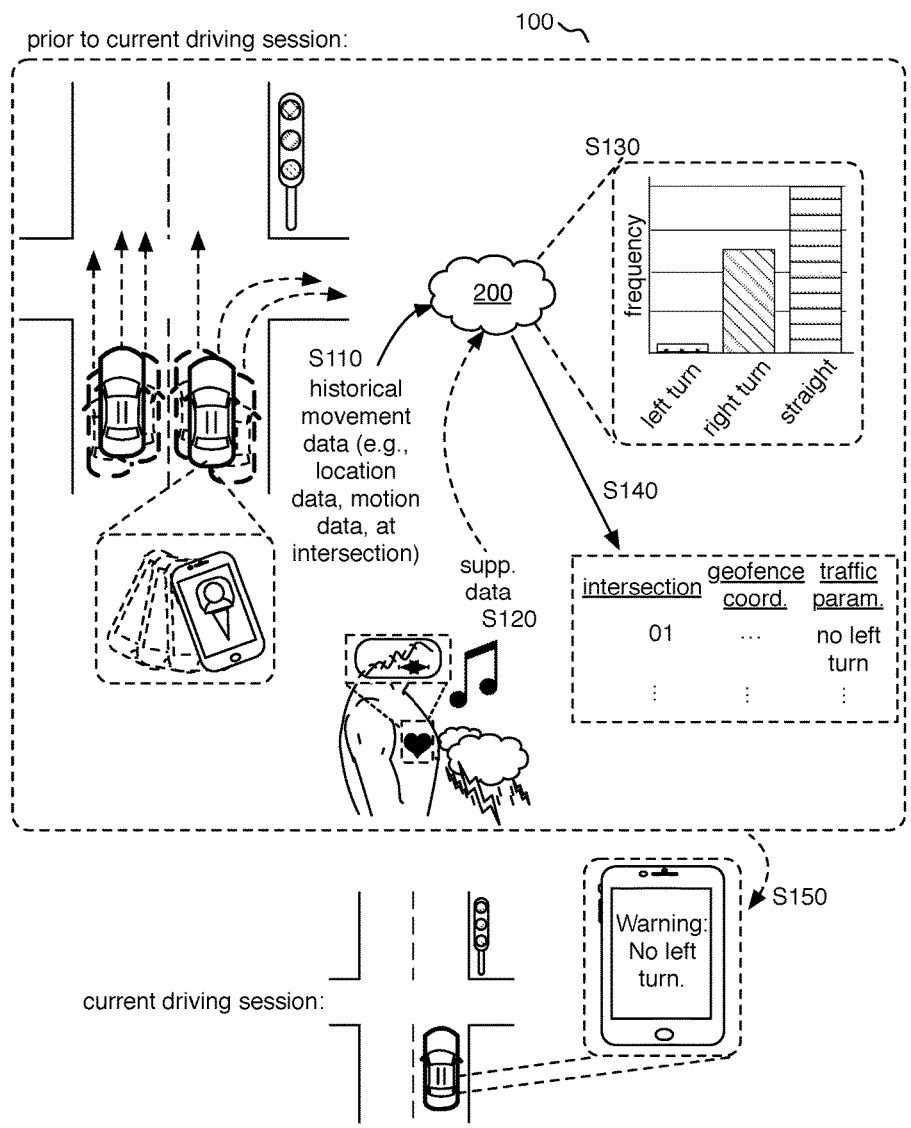
FIG. 3 is a graphical representation of a variation of an embodiment of the method.

As shown in FIGS. 1-3, embodiments of a method 100 for traffic characterization associated with a vehicle can include: collecting a movement dataset sampled at least at one of a location sensor and a motion sensor associated with the vehicle, during a driving session associated with movement of the vehicle (e.g., a time period during which the vehicle moves) S110; extracting a set of features from the movement dataset associated with movement of the vehicle during the driving session S130; and determining one or more traffic-related characteristics associated with the vehicle based on the set of features S140. Additionally or alternatively, the method 100 can include: collecting a supplementary dataset configured to supplement the movement dataset S120; initiating a traffic-related action based on the one or more traffic-related characteristics S150; and/or any other suitable processes.

Embodiments of the method 100 and/or system 200 function to characterize one or more vehicles' interactions with one or more aspects related to traffic (e.g., the vehicle's compliance with traffic laws; identification of traffic indicators associated with the vehicle's route; etc.) to aid users (e.g., drivers; users residing in and/or on the vehicle; users associated with the driving session; users independent of the driving session; etc.) and/or other entities (e.g., third parties such as insurance entities; etc.) in relation to evaluating, improving, and/or otherwise processing traffic-related characteristics. In a specific example, the method 100 and/or system 200 can determine traffic-related characteristics for a vehicle based on movement features of the vehicle and other vehicles (e.g., through comparing a vehicle's movement features relative to movement features of geographically proximal vehicles on the same vehicular path during the current time period or a historic time period, such as to determine speed limit compliance, etc.), in relation to traffic regulations surrounding posted speed limitations and/or other speed limitations established by other traffic or environmental conditions. Additionally or alternatively, the method 100 and/or system 200 can function to leverage the traffic-related characteristics in determining and/or promoting traffic-related actions. For example, the method 100 and/or system 200 can enable real-time traffic characterization based on at least one of movement data and supplemental data to automatically generate traffic-related educational guidance (e.g., optimized route information).

The method 100 is preferably implemented on one or more mobile devices removably coupled to one or more vehicles (e.g., residing in the vehicle; mounted to the vehicle and/or component coupled to the vehicle; physically coupled to the vehicle; communicatively coupled to the vehicle; etc.). Additionally or alternatively, the method 100 can be implemented by any number of suitable devices (e.g., including the vehicle itself; remote computing systems; etc.). One or more instances and/or portions of the method 100 and/or processes described herein can be performed asynchronously (e.g., sequentially), concurrently (e.g., in parallel; concurrently on different threads for parallel computing to improve system processing ability for determining and/or otherwise processing traffic-related characteristics; etc.), in temporal relation to a trigger event, and/or in any other suitable order at any suitable time and frequency by and/or using one or more instances of the system 200 (e.g., a system 200 including processing systems such as remote computing systems; sensors; vehicles; mobile devices; etc.), elements, and/or entities described herein. However, the method 100 and/or system 200 can be configured in any suitable manner.

2. Benefits

In specific examples, the method 100 and/or system 200 can confer several benefits over conventional methodologies used for determining traffic related characteristics. In specific examples and/or variations, the method 100 and/or system 200 can perform one or more of the following:

First, the technology can leverage non-generic location data (e.g., location datasets, GPS data, etc.) and/or motion data (e.g., motion datasets, accelerometer data, gyroscope data, etc.) to conveniently and unobtrusively determine a traffic-related characteristic. In examples, the location data and/or motion data can be passively collected at a user's mobile computing device (e.g., a smartphone), such that the technology can perform traffic characteristic determination without requiring a user to purchase additional hardware (e.g., a specialized onboard device for monitoring traffic-related characteristics, a purpose-built such device, etc.).

Second, the technology can determine traffic-related characteristics with high accuracy. In examples, the technology can accurately infer traffic laws (e.g., traffic regulations, traffic rules, de facto traffic rules based on aggregated traffic data, etc.) based on movement data collected from the field, thereby minimizing the use of third party datasets that compile traffic regulations for various geographic locations, which can be outdated, inaccurate, or otherwise unsuitable. Further, the technology can provide accurate traffic-related characteristic determination while allowing a user to have flexibility in placement of their mobile computing device in relation to the vehicle (e.g., motor vehicles, bicycles, watercraft, aircraft, spacecraft, railed vehicles, etc.). Traffic-related characteristics can be determined when the mobile computing device collecting movement data is in a user's pocket, in a user's hand, mounted within the car, in a cup holder, and/or in other suitable locations within the vehicle.

Third, the technology can automatically initiate traffic-related actions in response to determination of traffic-related characteristics. Traffic-related actions can include any one or more of controlling the user device, sending a notification to the user or a related entity, generating user-specific content, and/or other suitable user-related actions. Further, in examples, the type of initiated traffic-related action can be tailored to the particular traffic-related characteristic based on movement data (e.g., motion data, location data, etc.) and/or supplemental data. In examples, the technology can include a software development kit for third-parties to integrate the traffic-related characteristic determination features, thereby enabling third-parties to leverage traffic-related characteristics and related data for purposes of driving education, ride sharing, valet services, navigation, roadside assistance, insurance processing, emergency services, and/or other suitable services.

Fourth, the technology can determine traffic-related characteristics in real-time (e.g., instantaneously, substantially real-time, near real-time, etc.). Prompt determination of traffic-related characteristics (e.g., compliance with traffic laws or regulations, deviation from ambient traffic characteristics, etc.) can enable timely provision (e.g. during the in-trip time period) of appropriate messages (e.g., driver specific messages, passenger specific messages, moving violation specific messages, compliance specific messages, noncompliance specific messages, etc.) to the user.

Fifth, the technology can improve the technical fields of at least vehicle telematics, computational modeling of traffic-related characteristics, and traffic-related characteristic determination with mobile computing device data. The technology can continuously collect and utilize non-generic sensor data (e.g., location sensor data, motion sensor data, GPS data, audio/visual data, ambient light data, etc.) to provide real-time determination of traffic-related characteristics. Further, the technology can take advantage of the non-generic sensor data and/or supplemental data (e.g., vehicle sensor data, weather data, traffic data, environmental data, biosignal sensor data, etc.) to better improve the understanding of correlations between such data and traffic-related characteristic, leading to an increased understanding of variables affecting user behavior while driving and/or riding in a vehicle and/or traffic behavior at the scale of a population of users driving vehicles.

Sixth, the technology can provide technical solutions necessarily rooted in computer technology (e.g., utilizing computational models to determine user characteristics from non-generic location and/or motion datasets collected at mobile computing devices, etc.) to overcome issues specifically arising with computer technology (e.g., issues surrounding how to leverage movement data collected by a mobile computing device to determine traffic-related characteristics, and/or to automatically initiate traffic-related actions for responding to traffic-related characterization, etc.).

Seventh, the technology can leverage specialized computing devices (e.g., computing devices with GPS location capabilities, computing devices with motion sensor functionality, etc.) to collect specialized datasets for characterizing traffic behaviors executed by the vehicle (e.g., under the influence of the driver's control, when controlled by an autonomous control system, etc.).

Eighth, the technology can enable prompt collision detection (e.g., substantially as described in U.S. application Ser. No. 15/727,972, filed 9 Oct. 2017, which is incorporated herein in its entirety by this reference), and correlation of the collision with whether the user was in compliance with traffic regulations at the time of the collision (e.g., to determine a fault status of the user, to determine a not-fault status of the user, etc.).

The technology can, however, provide any other suitable benefit(s) in the context of using non-generalized computer systems for determining one or more traffic-related characteristics and initiating traffic-related actions.

3.1 Method—Collecting a Movement Dataset

Block S110 recites: collecting a movement dataset sampled at least at one of a location sensor and a motion sensor associated with the vehicle, during a time period of movement of the vehicle. Block S110 functions to collect movement-related data for use in evaluating one or more traffic-related characteristics associated with vehicles (e.g., motor vehicles, bicycles, watercraft, aircraft, spacecraft, railed vehicles, etc.), users (e.g., a vehicle driver, vehicle passenger, pedestrian, etc.) and/or other suitable entities.

Movement datasets preferably describe at least one of position, velocity, and/or acceleration (PVA) of one or more vehicles, user devices (e.g., user smartphones), users, and/or any other suitable entities, but can additionally or alternatively describe any suitable movement-related characteristic. For example, movement dataset collected at a first entity (e.g., sampled at a sensor of a user device) can describe movement of the first entity (e.g., movement dataset describing PVA of the vehicle in which the user device resides) and/or one or more other entities (e.g., movement dataset sampled at a sensor of a first user device residing in a first vehicle, where the movement dataset describes PVA of a second vehicle geographically proximal the first vehicle, etc.). Movement datasets are preferably sampled at one or more movement sensors indicative of one or more of motion and/or location, which can include one or more of: motion sensors (e.g., multi-axis and/or single-axis accelerometers, gyroscopes, etc.), location sensors (e.g., GPS data collection components, magnetometer, compass, altimeter, etc.), sensors associated with vehicle diagnostic systems (e.g., OBD-I, OBD-1.5, OBD-II, CAN, etc.), optical sensors, audio sensors, electromagnetic (EM)-related sensors (e.g., radar, lidar, sonar, ultrasound, infrared radiation, magnetic positioning, etc.), environmental sensors (e.g., temperature sensors, etc.), biometric sensors, and/or any other suitable sensors.

Movement datasets preferably include both location datasets (e.g., data describing the location of the sensor collecting the movement dataset) and motion datasets (e.g., data describing the motion of the sensor collecting the movement datasets). However, a movement dataset can, in some variations, include only a location dataset or only a motion dataset. In still further variations, the method can include collecting a movement dataset that includes only a motion dataset at a first time point, and collecting a movement dataset that includes only a location dataset at a second time point, wherein the first time point can precede the second time point, the second time point can precede the first time point, and/or the first and second time points can be contemporaneous (e.g., simultaneous, substantially simultaneous, proximal in time, etc.).

Block S110 preferably includes collecting movement datasets associated with different traffic-related situations including vehicle interaction (e.g., historic, current, and/or predicted interaction) with one or more: traffic laws (e.g., PVA data for a vehicle in the context of applicable traffic laws, traffic regulations, traffic rules, etc.), traffic indicators (e.g., PVA data in relation to compliance with traffic indicators, etc.) and/or other suitable traffic parameters. Traffic laws (e.g., regulations) can include any one or more of: driving rules, vehicle code such as Department of Motor Vehicles (e.g., DMV, bureau of motor vehicles/BMV, motor vehicle department/MVD, etc.) code, moving violations (e.g., speed limits, reckless driving, driving under the influence, illegal turns, illegal lane changes, incompliance or noncompliance with traffic indicators, etc.), non-moving violations (e.g., parking violations, license violations, paperwork violations, equipment violations, etc.), and/or any other suitable laws or regulations associated with vehicles. Traffic indicators can include any one or more of: traffic signs (e.g., stop signs, warning signs, regulatory signs, guide signs, yield signs, construction signs, recreational signs, service signs, marker signs, etc.), traffic lights (e.g., street lights, signal lights, vehicle lights, supplemental device lights, building lights, etc.), traffic markings (e.g., road surface markings such as yellow and/or white lines; bike lane markings; yield lines; lane markings; turnout markings; passing lanes; carpool lanes; turn indicators; etc.), and/or any other suitable indicators of traffic-related aspects. In a specific example, the method 100 can include collecting a movement dataset; identifying a location corresponding to the movement dataset; mapping (e.g., at a traffic-related characteristic database, at a remote database, etc.) the location to a set of traffic parameters applicable to the location (e.g., to a traffic regulation applicable to the location; and storing the movement dataset in association with the set of traffic parameters. In the aforementioned specific example and related examples, mapping the location to the set of traffic parameters can tagging, labeling, and/or otherwise associating the movement dataset to the location. In another example, the method 100 can include determining an indicator type associated with a visual traffic indicator, based on movement features (e.g. a vehicle motion characteristic) wherein the vehicle motion characteristic characterizes a vehicle interaction with the visual traffic indicator; associating the indicator type with the vehicle location; and storing the indicator type in association with the vehicle location at a traffic map stored at a remote computing system. In this example, the type of a visual traffic indicator (e.g., a stop sign, a traffic light, etc.) can be inferred based on motion characteristics (e.g., wherein a vehicle stopping for a predetermined time period corresponds to a stop sign at a four way intersection, wherein a vehicle exhibits a pattern of accelerometer signals corresponding to approaching a red light that changes to a green light, etc.) without the use of optical data. However, processing movement datasets in relation to traffic-related situations can be performed in any suitable manner.

Block S110 preferably includes collecting one or more location datasets, which can include any one or more of: GPS data (e.g., position coordinates, associated time stamps, etc.), geolocation data (e.g., indicating county, city, country, and/or other suitable geographic region corresponding to a specific set of traffic parameters, etc.), geofence data (e.g., whether the location dataset corresponds to a location inside a geofence, outside a geofence, etc.), microlocation (e.g., determined using in-vehicle microlocation beacons, etc.), indoor positioning system data, local positioning system data, multilateration data, GSM localization data, self-reported positioning, control plane locating data, compass data, magnetometer data, route data (e.g., origin, destination, location along a route, etc.), and/or any other suitable location-related data. In an example, GPS data can be leveraged for complete PVA solutions, but can additionally or alternatively include any movement data, such as retrieved using GNSS data (e.g., via GLONASS, Galileo, BeiDou, etc.). In a specific example, Block S110 can include determining change in relative distance between a plurality of user devices (e.g., residing in different vehicles, arranged in vehicles proximal to a primary vehicle, located in vehicles within a predetermined distance of one another such as 150 ft, 1-500 ft, etc.) to determine PVA parameters corresponding to vehicles associated with the plurality of user devices. However, collecting one or more location datasets can be performed in any suitable manner.

Block S110 preferably includes collecting one or more motion datasets, which can include one or more of: accelerometer data (e.g., single-axis data, multi-axis data), gyroscope data (e.g., single-axis data, multi-axis data), velocity data (e.g., speed, instantaneous velocity, average velocity, change in velocity, velocity variability over time, maximum velocity, minimum velocity, etc.), acceleration data (e.g., instantaneous acceleration, gravitational acceleration, average acceleration, change in acceleration, acceleration variability over time, maximum acceleration, minimum acceleration, etc.), displacement data, orientation data, rotation data, turning data, and/or any other suitable motion-related data. In an example, Block S110 can include collecting motion datasets sampled at one or more inertial sensors (e.g., accelerometers, etc.) of the user device, where the motion datasets can be indicative of acceleration movement features, braking movement features, and/or other suitable movement features for the vehicle. In another example, Block S110 can include collecting a plurality of motion datasets corresponding to a set of user devices associated with a set of geographically proximal vehicles; and storing the plurality of motion datasets in association with each other (e.g., for subsequent processing to generate comparisons between relative motion in determining one or more traffic-related characteristics), but associating motion datasets (and/or other datasets) can be based on any suitable criteria. In a related example, Block S110 can include identifying a set of user devices corresponding to a set of secondary vehicles driving proximal the vehicle location during a driving session, and retrieving a set of movement datasets collected by the set of user devices contemporaneously with the driving session. However, collecting motion datasets can be performed in any other suitable manner.

In relation to Block S110, movement datasets can be collected by a plurality of mobile devices. In variations, Block S110 can include cooperative data capture based on mobile device data (e.g., data collected using a plurality of mobile computing devices). Thus, Block S110 can include any element substantially as described in U.S. application Ser. No. 15/921,152, filed 14 Mar. 2018, titled "Method for Mobile Device-Based Cooperative Data Capture", which is incorporated herein in its entirety by this reference.

In relation to Block S110, movement datasets (and/or supplemental datasets) are preferably sampled by components arranged at a user device (e.g., mobile device, smartphone, laptop, tablet, smart watch, smart glasses, virtual reality devices, augmented reality devices, aerial devices such as drones, medical devices, etc.), but can additionally or alternatively be sampled by components associated with (e.g., arranged at, positioned within, mounted to, physically connected to, etc.) any suitable device and/or vehicle (e.g., movement datasets sampled at vehicle sensors). In a specific example, Block S110 can include collecting movement data from a population of mobile devices associated with a user characteristic (e.g., a shared driving behavior, etc.) and/or vehicle characteristic (e.g., a shared driving session route, etc.), where the population-level data can be used to generate traffic characteristic models, determine reference traffic-related characteristic (e.g., expected speed limit for a driving session route at the current time, etc.), and/or otherwise determine and/or leverage traffic-related characteristics. In another example, Block S110 can include collecting movement data for a first vehicle from devices in geographically proximal vehicles (e.g., a second vehicle), from devices associated with pedestrians, and/or from other supplementary devices. Multiple sources of movement data can be used to reduce noise (e.g., through averaging data), improve data accuracy, fill gaps of movement data during a time period, increase confidence levels associated with determining traffic-related characteristics and/or initiating traffic-related actions, and/or perform any suitable operation in relation to the method 100. However, collecting movement data S110 can be performed in any suitable manner.

3.2 Method—Collecting Supplementary Data

The method 100 can additionally or alternatively include Block S120, which recites: collecting supplementary dataset configured to supplement the movement dataset. Block S120 functions to collect data that can be used in combination with, to filter, to control for errors in, and/or otherwise supplement movement data collected in Block S110, and/or other suitable data associated with the method 100.

In relation to Block S120, supplementary data can include any one or more of: traffic data (e.g., type of vehicular path such as a freeway road or local road upon which the vehicle is driving; accident data; traffic level; type of traffic congestion; etc.), vehicle data (e.g., indicative of vehicle information describing one or more characteristics of one or more vehicles; etc.), user data (e.g., behavioral datasets such as datasets describing driving behavior; social media datasets; demographic datasets; device event datasets; etc.), optical data (e.g., imagery; video; internal vehicle-facing optical data of users and/or other objects; external vehicle-facing optical data of route, landmarks, geographical markers; mobile computing device camera data; etc.), audio data (e.g., associated with vehicle operation and/or indicative of movement features, such as audio corresponding to vehicle turn signal operation, audio corresponding to acceleration and/or braking; audio associated with user conversations; traffic-related audio; audio associated with interactions between users and vehicles, between vehicles and proximal vehicles; environmental audio; etc.), biometric data (e.g., cardiovascular parameters, such as heart rate, which can be indicative of user driving behavior in response to different traffic-related situation; sleep parameters correlated with traffic parameter compliance risk, with vehicular accident events; respiration data; biological fluid data; etc.), environmental data (e.g., weather conditions, which can be correlated with changes in driving behavior in relation to a traffic parameter; pressure conditions; air quality; etc.), and/or any other suitable data for facilitating traffic-related characterization and/or traffic-related actions.

In a variation, Block S120 can include collecting environmental data. Environmental data can include any one or more of: weather conditions (e.g., weather forecast, temperature, humidity, precipitation, wind, etc.), road conditions (e.g., road closure, road opening, number of road lanes, road deterioration, etc.), pressure conditions (e.g., ambient pressure, etc.), air quality (e.g., pollution levels, etc.), and/or other suitable environmental data. In an example, a weather forecast describing thunderstorms proximal the driver's location (e.g., derived from a location dataset collected in accordance with one or more variations of Block S110, etc.) can indicate a higher likelihood of a weather dependent traffic characteristic (e.g., a slower average ambient speed corresponding to geographically proximal vehicles). In another example, weather data can be used to augment a traffic law used to determine a traffic compliance parameter (e.g., wherein a posted speed limit is reduced by 5 mph during rain, wherein a driver is required to turn on the vehicle lights in the event of rain, etc.). In another example, road conditions indicating a single-lane freeway, analyzed along with a motion dataset describing a vehicular speed in excess of the freeway speed limit, can indicate a greater chance of occurrence of a vehicular accident event and correspondingly higher risk parameter (e.g., determined in accordance with one or more variations of Block S140). However, collecting environmental data can be otherwise suitably performed.

In a variation, Block S120 can include collecting traffic data. Traffic data can include any one or more of: accident data (e.g., number of accidents within a predetermined radius of the user, accident frequency, accident rate, types of accidents, frequency of accidents, etc.), traffic level, traffic laws (e.g., speed limit, intersection laws, turning laws), traffic lights, type of vehicular path (e.g., freeway, intersection, etc.), and/or other suitable traffic data.

In an example, collecting traffic data can include querying a traffic information database (e.g., traffic accident tracker) with GPS coordinate inputs; and receiving a traffic report for a location proximal the vehicle location. In another example, higher amounts of traffic proximal the vehicle location can indicate a higher likelihood of a multi-vehicle collision. In another example, a vehicle driver violating traffic laws (e.g., turning left at an intersection prohibiting left turns) can indicate a higher likelihood of a particular vehicle accident type (e.g., a T-bone collision). However, collecting traffic data can be otherwise suitably performed.

In an example of this variation, the method 100 can include: collecting traffic data (e.g., online sources) describing traffic parameters for a location (e.g., county, city, state, etc.); parsing the traffic data (e.g., through applying natural language processing algorithms, which can be applied to any suitable portion of the method 100. etc.); and associating the parsed traffic data with the location (e.g., geofences corresponding to the location, etc.).

In another example, the method 100 can include: collecting optical data for visual traffic indicators (e.g., satellite imagery capturing traffic signs, traffic lights, traffic markings, etc.); classifying the visual traffic indicators based on the optical data (e.g., through leveraging computer vision algorithms, which can be applied to any suitable portion of the method 100; etc.); and updating a traffic map (e.g., stored at a traffic-related characteristic database and usable for any suitable portion of the method 100) with the classified visual traffic indicators. In another example, the method 100 can include: collecting an image dataset at an image sensor of the mobile computing device, wherein the image sensor of the mobile computing device is arranged within the vehicle to image a spatial region forward of the vehicle; extracting a visual traffic indicator from the image dataset; validating a traffic law (e.g., determined based on one or more variations of Block S140) based on the visual traffic indicator at the mobile computing device; determining the traffic compliance parameter in response to validating the traffic law; and updating a traffic map stored at the remote computing system based on validating the traffic law. However, processing of supplementary datasets can be performed in any suitable manner.

In a variation, Block S120 can include collecting contextual data. Contextual data can include any one or more of: temporal data (e.g., time of day, date, etc.), driver data, mobile electronic device usage (e.g., driver texting, usage of smartphone while driving, etc.), vehicle model data (e.g., model, age, accident history, mileage, repair history, etc.), light sensor data (e.g., associated with a user's mobile electronic device, etc.), and/or any other suitable contextual data.

In an example, collecting contextual data can include collecting driver behavior data (e.g., actively collected driver data, derived from movement data, etc.), which can be used to adjust and/or select one or more traffic characterization models and/or traffic-related characteristic models tailored to a given driver. Additionally or alternatively, Block S120 can include any elements described in U.S. application Ser. No. 14/206,721 filed 12 Mar. 2014 and entitled "System and Method for Determining a Driver in a Telematic Application," which is incorporated herein in its entirety by this reference.

In another example, Block S120 can include collecting temporal data indicating the time (e.g., of day, of the year, etc.) when a driving session is occurring. For example, certain traffic characteristics and/or traffic laws can be correlated with certain times of day and/or days of the year (e.g., no left turns at a given intersection between the hours of 8-10 AM and 3-6 PM, a lower speed limit in a school zone at times when children are present, etc.). In another example, mobile computing device usage by the driver during the driving session (e.g., texting while driving) can provide insight into driver behaviors affecting the severity of traffic law noncompliance. However, collecting temporal data can be otherwise suitably performed.

Regarding Block S120, vehicle data can include any one or more of: proximity sensor data (e.g., radar, electromagnetic sensor data, ultrasonic sensor data, light detection and ranging, light amplification for detection and ranging, line laser scanner, laser detection and ranging, airborne laser swath mapping, laser altimetry, sonar, data indicating PVA of proximal vehicles, etc.), vehicle camera data (e.g., in-car cameras, exterior cameras, back-up cameras, dashboard cameras, front-view cameras, side-view cameras, image recognition data, infrared camera, 3D stereo camera, monocular camera, etc.), engine data, odometer, altimeter, location sensor data, motion sensor data, environmental data, light sensor data, vehicle diagnostic system data, data from application programming interfaces of traffic-related applications, and/or any other suitable vehicle data. In an example, collecting vehicle operation data (and/or other suitable data) can include receiving vehicle operation data (e.g., collected by a vehicle diagnostic system; sampled at a proximity sensor; etc.) at a user device (e.g., with an application executing on the user device) communicably connected to the vehicle (e.g., wirelessly paired with the vehicle; connected to the vehicle through a wired connection between a user device and an OBD port of the vehicle; authorized to receive data from the vehicle; authenticated by the vehicle; etc.); and/or receiving the vehicle operation data at a remote server (e.g., from the user device, for subsequent movement feature extraction and analysis; etc.). In another example, collecting vehicle operation data (and/or other suitable data) can include directly receiving the vehicle operation data from the vehicle (e.g., through a vehicle Internet connection; through vehicle registration associated with a remote server, such as through an application executing on a user device; etc.). Additionally or alternatively, any characteristics described in relation to movement datasets (e.g., in Block S110) can additionally or alternatively apply to supplementary datasets (e.g., collecting supplementary datasets at any time and/or frequency from one or more mobile devices associated with vehicles; etc.). However, collecting supplementary datasets S120 can be performed in any suitable manner.

3.3 Method—Processing Datasets

Block S130 recites: extracting a set of features associated with movement of the vehicle during the time period. The set of features can be defined as a vehicle motion characteristic (e.g., characteristic of vehicle motion) such as the path through space of the vehicle, the trajectory of the vehicle, PVA data associated with the vehicle, and any other suitable characteristics of vehicle motion. Block S130 functions to process data (e.g., collected in Blocks S110 and/or S120; output in Blocks S140 and/or S150, etc.) into a form suited for determining traffic-related characteristics and/or traffic-related actions.

Processing data can include any one or more of: extracting features, performing pattern recognition on data, fusing data from multiple sources, combining values (e.g., averaging values, normalizing values, etc.), standardizing, validating, converting (e.g., digital-to-analog conversion, analog-to-digital conversion), wave modulating, filtering (e.g., Kalman filtering), noise reduction, smoothing, model fitting, transforming, windowing, clipping, mapping, applying mathematical operations (e.g., derivatives, moving averages, etc.), multiplexing, demultiplexing, extrapolating, interpolating, and/or any other suitable processing operations. In a variation, processing data can include applying one or more computer-implemented rules (e.g., feature engineering rules for extracting features from one or more datasets) in processing data for conferring improvements (e.g., in accuracy of determining values of traffic-related characteristics; in storing and/or retrieving data such as traffic characteristic models, associated inputs, and/or associated outputs; in inventive distributions of functionality across networks including user devices, vehicles, remote computing systems, and/or other components; in leveraging non-generalized systems including location sensors, inertial sensors, proximity sensors, and/or other suitable systems; etc.) in one or more aspects of the system. Features (e.g., movement features, supplementary features) can include any one or more of: cross-user features (e.g., features combining PVA data derived from a plurality of user devices associated with a single vehicle or with a plurality of vehicles; etc.), cross-vehicle features (e.g., features analyzing PVA data from a set of proximal vehicles within a predetermined distance threshold from a vehicle associated with a current driving session; etc.), textual features (e.g., word frequency, sentiment, punctuation associated with textually-described traffic laws and/or regulations; textual features associated with words, numbers, and/or symbols on a traffic indicator such as a sign displaying one or more words; etc.), graphical features (e.g., color, size, shape, and/or other graphical features associated with traffic indicators, such as color of traffic signs, traffic lights, or traffic markings on a road; etc.), audio features (e.g., Mel Frequency Cepstral Coefficients extracted from audio captured by a user device during a driving session; etc.), and/or any other suitable types of features.

In relation to Block S130, movement features preferably characterize PVA of the vehicle, user device, and/or other suitable entity. Additionally or alternatively, movement features can include any one or more of: raw movement data (e.g., raw location data, raw motion data, etc.), processed movement data, movement profiles (e.g., driving profile, braking profile, position profile, speed profile, acceleration profile, turning profile, etc.), identified driving actions (e.g., parking, acceleration, braking, short following, lane-departure, freewheeling, U-turn, left turn, right turn, over-revving, stationary vehicle, moving vehicle, etc.), user physical activity features (e.g., user cardiovascular parameters; walking pace; walking routes to and/or from vehicles; breathing parameters; physical activity characteristics before, during, and/or after driving sessions; etc.), and/or any other suitable features. In a variation, Block S130 can include applying a feature selection rule (e.g., feature selection algorithms such as exhaustive, best first, simulated annealing, greedy forward, greedy backward, and/or other suitable feature selection algorithms) to filter, rank, and/or otherwise select features for use in generating one or more traffic characterization models (e.g., in Block S130). Feature selection rules can select features based on optimizing for processing speed (e.g., model training and/or execution speed; data retrieval speed; etc.), accuracy (e.g., for determining traffic-related characteristics), traffic-related actions (e.g., determining traffic-related actions tailored to a user, vehicle, traffic-related situation, etc.) and/or any other suitable criteria operable to improve the system 200. Additionally or alternatively, computer-implemented rules can be applied in performing various portions of the method 100 (e.g., model generation and/or selection rules for characterizing users; user preference rules for promoting traffic-related actions; etc.) and/or in conferring any suitable improvements to the system 200. However, determining features and/or otherwise processing datasets can be performed in any suitable manner.

3.4 Method—Determining a Traffic-Related Characteristic

Block S140 includes determining one or more traffic-related characteristics associated with the vehicle based on the set of features (and/or any other suitable datasets, such as data collected in Blocks S110 and/or S120, historical movement datasets associated with user devices that have been arranged in vehicles traversing a proximal location as that of the primary vehicle at which the mobile computing device is located, and/or outputs associated with Block S140 and/or Block S150, etc.). Block S140 functions to evaluate, characterize, determine, store, update, and/or otherwise determine one or more traffic-related characteristics associated with one or more vehicles and/or users. Traffic-related characteristics preferably characterize one or more interactions (e.g., physical interactions, relative movement features, communicative interactions, etc.) between a vehicle and one or more of: supplementary vehicles (e.g., geographically proximal vehicles; etc.), traffic parameters (e.g., traffic laws, traffic indicators, etc.), users, user devices, pedestrians, and/or any other aspect associated with traffic. Traffic-related characteristics can include any one or more of: traffic compliance parameters (e.g., describing compliance with and/or deviation from traffic laws, traffic indicators, and/or other suitable traffic parameters; based on comparison of movement features and/or other suitable data for a driving session to traffic parameters associated with the driving session, such as traffic laws for locations of the driving session; etc.), traffic law parameters (e.g., predicted traffic laws, such as estimated speed limit based on PVA for a geographically proximal set of vehicles; operative traffic laws, such as derived from comparisons of predicted traffic laws to actual traffic laws; etc.), traffic indicator parameters (e.g., identified traffic indicators such as U-turn legality based on historical movement features for vehicles at an intersection; operative traffic indicators, such as derived from predicted traffic indictors to actual traffic indicators; etc.), route parameters (e.g., traffic-based routes from origin to destination; estimated time to destination; vehicular accident events on route; etc.), risk parameters (e.g., risk of incompliance with traffic parameters; risk relative to other users and/or vehicles; risk of vehicular accident events; risk of user injury; insurance-related risks; energy-related risks such as fuel depletion; wherein risk can be expressed as a probability value, an expected value over a predetermined time period or predetermined distance traveled, an actuarial table, etc.), and/or any other suitable parameters related to traffic. In variations, Block S140 can include determining traffic-related characteristic tailored to one or more conditions (e.g., temporal conditions, location conditions, vehicle conditions). In specific examples, Block S140 can include estimating an operative speed limit (and/or other suitable traffic-related characteristic) for a location (e.g., a particular road on a route; etc.), time (e.g., at a particular time of day, etc.), vehicle type (e.g., fleet vehicles, cargo trucks, motorcycles, taxis, buses, tow vehicles, etc.), and/or any other suitable criteria. In an example, wherein the traffic law defines a prohibition against executing a first traffic maneuver at the vehicle location, the method 100 can include determining a second traffic maneuver executed by the vehicle during the driving session at the vehicle location, and determining the traffic compliance parameter based on a comparison between the first traffic maneuver and the second traffic maneuver (e.g., comparing accelerometer signals corresponding to a U-turn executed by the vehicle to the U-turn defined by the traffic law as prohibited). However, traffic-related characteristics can be otherwise suitably determined in any suitable manner.

In variations, Block S140 includes determining a risk parameter (e.g., based on the traffic related characteristics; wherein the traffic-related characteristic is the risk parameter; etc.). The risk parameter is preferably determined according to a risk model associated with the user; Block S140 can include generating the risk model and/or utilizing the risk model to determine the risk parameter. Thus, Block S140 can include any element described in U.S. application Ser. No. 16/000,675, filed 5 Jun. 2018, and titled "Method and System for Risk Modeling in Autonomous Vehicles", which is incorporated herein by this reference in its entirety. However, Block S140 can additionally or alternatively include determining a risk parameter in any other suitable manner.

Regarding Block S140, determining traffic-related characteristics is preferably based on one or more movement features (e.g., derived from datasets sampled at a user smartphone), but can additionally or alternatively be based on any suitable datasets. In a variation, determining traffic-related characteristics can be based on PVA data (e.g., movement features extracted from location data and/or motion data). In an example, Block S140 can include determining a traffic compliance parameter based on comparing a current vehicle speed to an average vehicle speed derived from speeds for geographically proximal vehicles (e.g., driving on the highway), where incompliance with a traffic law can be predicted in response to the current vehicle speed exceeding the average vehicle speed beyond a threshold amount. In another example, Block S140 can include determining a traffic compliance parameter based on comparing a current vehicle speed to an actual speed limit (e.g., derived from parsing optical data of a speed limit sign for the road on which the vehicle is traveling, inferred from historical average speeds of vehicles along the same roadway on which the vehicle is traveling, retrieved from a roadway database, etc.). In another example, Block S140 can include determining a risk parameter (e.g., of a traffic violation, where the risk can be presented to the user as a traffic-related notification for guidance; etc.) based on comparing a current vehicle speed on a road to an operative speed limit derived from a set of historical PVA data for vehicles traveling on the road. In this variation, Block S140 can include determining traffic compliance parameters based on location data. For example, the method 100 can include: identifying a set of user devices associated with a location of the driving session (e.g., user devices currently being used in driving sessions at the same location or proximal location; user devices associated with historical driving sessions at the same location or proximal location; user devices associated with driving sessions from a shared origin and/or to a shared destination; etc.); retrieving movement datasets for the user devices for driving sessions associated with the location, and determining a traffic-related characteristic (e.g., traffic law parameter, traffic regulation, etc.) based on the movement datasets. In another example, the method 100 can include: receiving, at a user device associated with a driving session, signal data (e.g., a broadcasted signal; a wirelessly transmitted signal; a WiFi-based signal; a Bluetooth-based signal; a personal area network signal; a local area network signal; a wide area network signal) transmitted from one or more supplemental devices (e.g., a supplemental user device residing in a supplemental vehicle), supplemental vehicles (e.g., a supplemental vehicle proximal to the vehicle of the driving session; etc.), and determining one or more traffic-related characteristics based on the signal data (e.g., deriving a traffic compliance parameter based on relative speed between the driving session vehicle and the supplemental vehicle from which the signal data originates, where the relative speed can be derived from the signal data, such as signal strength and/or angle of arrival describing location over time of the supplemental vehicle in relation to the driving session vehicle; etc.).

In this variation, Block S140 can include determining traffic-related characteristics based on motion data. For example, Block S140 can include determining a traffic lane parameter (e.g., legal lane changes; number of lanes; width of lanes; traffic directionality on the lane; etc.) for a road based on inertial sensor data (e.g., sampled at user smartphones associated with driving sessions on the road) describing vehicular movement in relation to lanes of the road (e.g., lane changes by the vehicles, etc.). In another example, Block S140 can include determining a traffic law parameter (e.g., legality of a vehicle turn, such as left turns, U-turns, etc.) for a location based on a set of motion datasets describing frequency and/or type of turns exhibited at the location (e.g., in historical driving sessions at an intersection, etc.). In another example, Block S140 can include determining a traffic indicator parameter (e.g., average duration of different modes of a traffic light, such as average duration of a green, yellow, or red light mode of a traffic light, etc.) based on a set of motion datasets describing vehicular stoppage duration (e.g., for stationary vehicles at a red light), vehicular drive-through duration (e.g., for vehicles driving through a green light), and/or other suitable parameters associated with traffic indicators. However, determining traffic-related characteristics based on PVA data and/or other movement features can be performed in any suitable manner.

In another variation, Block S140 can include determining traffic-related characteristics based on traffic data. For example, Block S140 can include: determining a location of a vehicle associated with a driving session; in response to receiving the location at a remote server, mapping the location to a set of traffic laws (e.g., derived from traffic data collected from a third party source) corresponding to the location; and determining a traffic compliance parameter based on comparing the traffic laws against a movement dataset associated with the feature. In another example, Block S140 can include determining a risk parameter based on accident data for a type of vehicular path (e.g., highway, which can be correlated with increased risk of vehicular accident event; local road; etc.) included in a driving session route. In variations, Block S140 can be based on any one or more of: vehicle data (e.g., collecting at least one of radar, sonar, and/or lidar data from a vehicle, where the data is indicative of relative speeds of proximal vehicles; and determining one or more traffic-related characteristics based on the relative speeds; etc.), optical data (e.g., identifying traffic indicator parameters and/or traffic law parameters based on imagery and/or video capturing the traffic indicators, such as a speed limit sign; determining traffic-related characteristics based on PVA data derived from optical data; etc.), audio data (e.g., identifying a vehicle turn at an intersection based on audio data indicating turn signal audio; and comparing the vehicle turn to traffic laws associated with turn legality at the intersection; etc.), user data (e.g., deriving user perspectives regarding traffic laws and/or traffic indicators based on social media data; and determining traffic-related characteristics based on the user perspectives; etc.), biometric data (e.g., determining cardiovascular parameters during time periods associated with different traffic-related situations; deriving a driving behavior based on the cardiovascular parameters; and determining traffic-related characteristics based on the driving behavior; etc.). However, determining traffic-related characteristics based on supplementary data can be performed in any suitable manner.

Block S140 preferably includes determining traffic-related characteristics with one or more traffic characteristic models (e.g., using movement features and/or other suitable datasets for inputs; outputting traffic-related characteristics and/or associated confidence levels; etc.) including any one or more of: probabilistic properties, heuristic properties, deterministic properties, and/or any other suitable properties. In examples, Block S140 and/or other portions of the method 100 (e.g., applying a traffic-related action model for determining traffic-related actions) can employ machine learning approaches including any one or more of: supervised learning, unsupervised learning, semi-supervised learning, reinforcement learning, regression, an instance-based method, a regularization method, a decision tree learning method, a Bayesian method, a kernel method, a clustering method, an associated rule learning algorithm, a neural network model, a deep learning algorithm, a dimensionality reduction method, an ensemble method (e.g., determining a first speed for a proximal vehicle based on processing signal data associated with the proximal vehicle using a first traffic characteristic model during a time period; determining a second speed for the proximal vehicle based on processing optical data captured of the proximal vehicle using a second traffic characteristic model during the time period; and determining a final speed for the proximal vehicle during the time period based on combining the first and second speeds such as through averaging, weighting, and/or other processes; etc.), and/or any suitable form of machine learning algorithm. In a specific example, the method 100 can include collecting a set of movement datasets for one or more users during historic driving sessions, the set of movement datasets associated with known traffic-related characteristics (e.g., route; time from origin to destination; compliance with traffic laws and/or traffic indicators; date; etc.); generating (e.g., training; updating; etc.) a traffic characteristic model based on the set of movement datasets and the known traffic-related characteristics; and determining a traffic-related characteristic for a current driving session based on a movement dataset for the driving session (e.g., determining estimated route time based on the historical driving sessions for the route; determining a traffic compliance parameter associated with speed limit based on comparing a speed for the current driving session to historic speeds for the historic driving sessions along a shared route; etc.). In another example, wherein the vehicle motion characteristic is a vehicle speed, wherein the traffic law is a speed limit, Block S140 includes 4 comparing the vehicle speed to the speed limit, and determining a risk parameter based on comparing the vehicle speed to the speed limit (e.g., as described above). However, applying traffic characteristic models to determine traffic-related characteristics can be performed in any suitable manner.

In another variation, Block S140 can include determining a traffic-related characteristic (e.g., associated with vehicle movement) based on a set of movement datasets collected by a set of user devices contemporaneously with the driving session (e.g., corresponding to geographically proximal vehicles), and determining a traffic compliance parameter based on a comparison between the traffic-related characteristic and the vehicle motion characteristic (e.g., a comparison between an ambient speed and the vehicle speed). In a related variation, the traffic compliance parameter can be determined based on a comparison between the vehicle motion characteristic and a traffic law. In still further variations, the traffic compliance parameter can be determined based on a combination of a comparison between the traffic-related characteristic and the vehicle motion characteristic and a comparison between the traffic law and the vehicle motion characteristic (e.g., to consider the behavior of ambient traffic in evaluating user compliance with the traffic law, as in cases where "going with the flow" of the traffic can be acceptable even if the ambient speed is greater than the speed limit, etc.).

In variations of Block S140, different traffic characterization models (e.g., generated with different algorithms, with different sets of features, with different input and/or output types, etc.) can be used (e.g., determined; selected; stored, retrieved, executed, updated, etc.) based on any one or more of the types of data associated with the method 100, which can confer improvements to the system 200 by improving traffic characterization accuracy (e.g., by tailoring analysis to a particular driving session, vehicle, user, and/or other entity, etc.), retrieval speed for the appropriate model from a database (e.g., by associating tailored traffic characteristic models with particular user accounts and/or other identifiers), training and/or execution of models (e.g., using feature-engineering computer implemented rules, etc.), and/or other suitable aspects of the system 200. However, any suitable number and/or type of traffic characterization models can be used in any suitable manner. Additionally or alternatively, in relation to Block S140, determining traffic-related characteristics can be performed using threshold conditions (e.g., monitoring traffic compliance parameters in response to PVA data exceeding a PVA threshold; determining risk parameters in response to detecting a geographically proximal law enforcement entity; etc.), reference profiles (e.g., comparison of a current driving behavior profile to reference driving behavior profiles associated with traffic law compliance or incompliance, comparison to reference traffic-related characteristics, users, user accounts, vehicles, etc.), weights, and/or any other suitable data. However, determining traffic-related characteristics S140 can be performed in any suitable manner.

3.5 Initiating a Traffic-Related Action

The method 100 can additionally or alternatively include Block S150, which recites: initiating one or more traffic-related actions based on the one or more traffic-related characteristics. Block S150 functions to determine, promote, provide, and/or otherwise initiate a traffic-related action for responding to determination of one or more traffic-related characteristics. Traffic-related actions can include any one or more of: traffic-related notifications, insurance processing, and/or dataset processing (e.g., storing traffic-related characteristics such as traffic law parameters in association with one or more vehicular path identifiers identifying vehicular paths; storing traffic-related characteristics such as traffic compliance parameters in association with one or more user accounts identifying one or more users; etc.), where such processing can confer improvements in data storage and/or retrieval, such as for generating risk profiles for users for subsequent processing (e.g., presentation to the user and/or associated entities; transmission to insurance entities; etc.). However, traffic-related actions can include any suitable type of traffic-related action.

In a variation of Block S150, initiating traffic-related notifications can include generating, transmitting, presenting, and/or otherwise promoting traffic-related notifications including any one or more of: educational notifications (e.g., including driving sessions summaries including traffic-related characteristics; including advice for improving traffic-related characteristics such as reducing risk parameter values and/or increasing traffic compliance values, as shown in FIGS. 2-3; etc.), services notifications (e.g., for facilitating services such as insurance services; emergency services; routing services, where routes can be determined for optimizing traffic-related characteristics, such as time from origin to destination; roadside assistance services; vehicle repair services; technical services for autonomous vehicles; etc.), and/or any other suitable notifications. For example, as shown in FIG. 3, the method 100 can include presenting a traffic-related notification including a traffic indicator (e.g., retrieved from a traffic-related characteristic database including associations between locations and traffic indicators) corresponding to location of a current driving session. In another example, Block S150 can include promoting a roadside assistance service notification in response to detecting a vehicle stoppage event (e.g., a vehicle pulling over to the side of the road; etc.) in the context of proximal vehicles traveling at greater relative speeds (e.g., vehicles passing by the vehicle pulling over; etc.). In another example, Block S150 can include personalizing a traffic-related notification (and/or other traffic-related action) to a driving behavior of a user. In a specific example, the method 100 can include determining a driving behavior indicating a high frequency of driving through intersections when a traffic light is transitioning to a stop indicator (e.g., while a traffic light is displaying a yellow light subsequently to displaying a green light, in advance of displaying a red light); and promoting a traffic-related notification warning indicating an upcoming traffic light and/or a corresponding status in relation to the stop indicator (e.g., warning the user to reduce driving speed to allow for smoother braking upon transition of a traffic signal from green to red, warning the user that the user has increased his or her risk of running a red light by a determined amount by his or her behavior, etc.). However, initiating traffic-related notifications can be performed any suitable manner.

In another variation of Block S150, facilitating insurance processing can include any one or more of: processing insurance claims (e.g., pre-filling insurance claims, transmitting insurance claims, etc.), insurance education, transmitting traffic-related characteristics (e.g., risk parameters; traffic compliance parameters; etc.) and/or associated information (e.g., datasets collected in Block S110-S120) to an insurance company and/or related entities or insurance entities (e.g., insurance underwriters, primary insurers, secondary insurers, an insurance agent, a claims adjuster, etc.), and/or any other suitable action. In an example, Block S150 can include automatically filling (e.g., in response to a vehicular accident event; in response to a manual request by the user; etc.) and transmitting a first notice of loss (FNOL) with information derived from traffic-related characteristics describing the vehicular accident event (e.g., speeds of geographically proximal vehicles; speed of a vehicle involved in the vehicular accident event; historical speeds of vehicles on the route; traffic law parameters and/or traffic indicator parameters associated with the location of the vehicular accident event; etc.), and/or derived from any suitable datasets associated with the method 100. However, facilitating insurance processing can be performed in any suitable manner.

In another variation of Block S150, initiating a traffic-related action can include controlling one or more user devices (e.g., including supplemental sensors from which supplemental datasets are collected) to promote the traffic-related action (e.g., through generating control instructions for the user devices, such as at a remote computing system, and transmitting the control instructions to the user devices; through activating an application executable on the user device; etc.). In an example, Block S150 can include controlling one or more devices (e.g., user devices, vehicles, etc.) to sample datasets, present traffic-related notifications, modify vehicle operation and/or parameters of a driving session (e.g., PVA parameters, route parameters, environmental parameters such as temperature and/or lighting; etc.), and/or perform any suitable process (e.g., for optimizing traffic-related characteristics, etc.). Additionally or alternatively, controlling user devices can be performed in any suitable manner.

In another variation, Block S150 can include performing navigation based on the traffic-related characteristic. Thus, Block S150 can include any element substantially as described in U.S. application Ser. No. 15/243,513, filed 29 Aug. 2016, and titled "Method for Accelerometer-Assisted Navigation", which is incorporated herein in its entirety by this reference.

In a specific example, wherein the traffic compliance parameter indicates the vehicle motion characteristic as noncompliant with the traffic law, Block S150 can include generating a notification indicative of noncompliance and a corrective driver action, and providing the notification to the user at the mobile computing device. The notification can a textual notification (e.g., a message rendered at a display of the mobile device), an audio notification (e.g., a synthesized spoken message, an audio signature indicative of a particular traffic infraction, etc.), a visual notification (e.g., a flashing light, an image rendered on a display, etc.), and any other suitable notification type. In another example, Block S150 includes storing the traffic compliance parameter in association with a user account of the user at a remote computing system (e.g., in a database of user profiles and/or accounts). In another example, Block S150 includes transmitting the traffic compliance parameter to an insurance entity associated with the user.

However, initiating traffic-related actions can additionally or alternatively be performed in any other suitable manner.

3.6 Further Specific Examples

Figure 4:
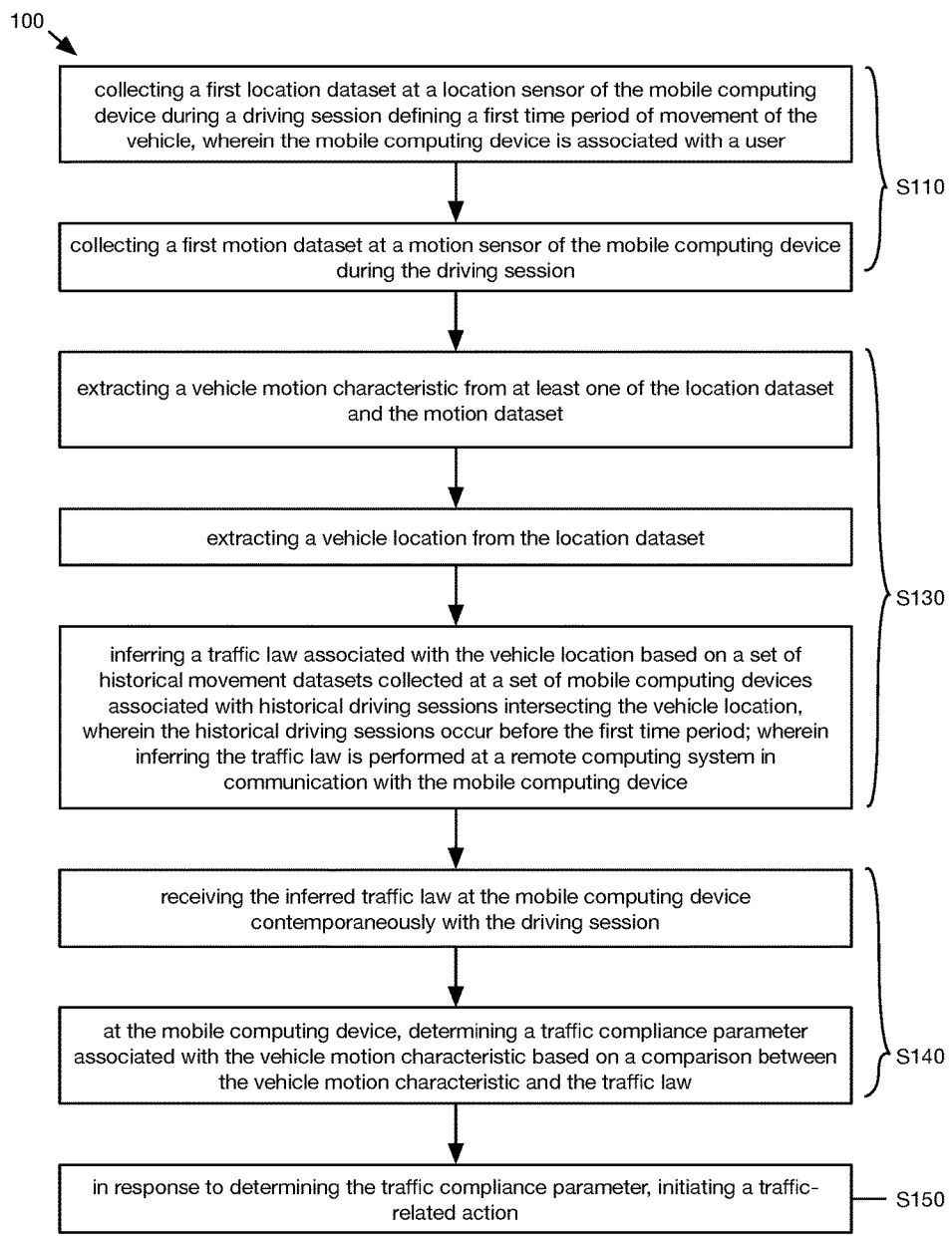
FIG. 4 depicts a flowchart representation of an example implementation of an embodiment of the method.

In a first specific example, as shown in FIG. 4, the method 100 includes: collecting a first location dataset at a location sensor of the mobile computing device during a driving session defining a first time period of movement of the vehicle, wherein the mobile computing device is associated with a user; collecting a first motion dataset at a motion sensor of the mobile computing device during the driving session; extracting a vehicle motion characteristic from at least one of the location dataset and the motion dataset; extracting a vehicle location from the location dataset; inferring a traffic law associated with the vehicle location based on a set of historical movement datasets collected at a set of mobile computing devices associated with historical driving sessions intersecting the vehicle location, wherein the historical driving sessions occur before the first time period; wherein inferring the traffic law is performed at a remote computing system in communication with the mobile computing device; receiving the inferred traffic law at the mobile computing device contemporaneously with the driving session; at the mobile computing device, determining a traffic compliance parameter associated with the vehicle motion characteristic based on a comparison between the vehicle motion characteristic and the traffic law; and in response to determining the traffic compliance parameter, initiating a traffic-related action.

Figure 5:
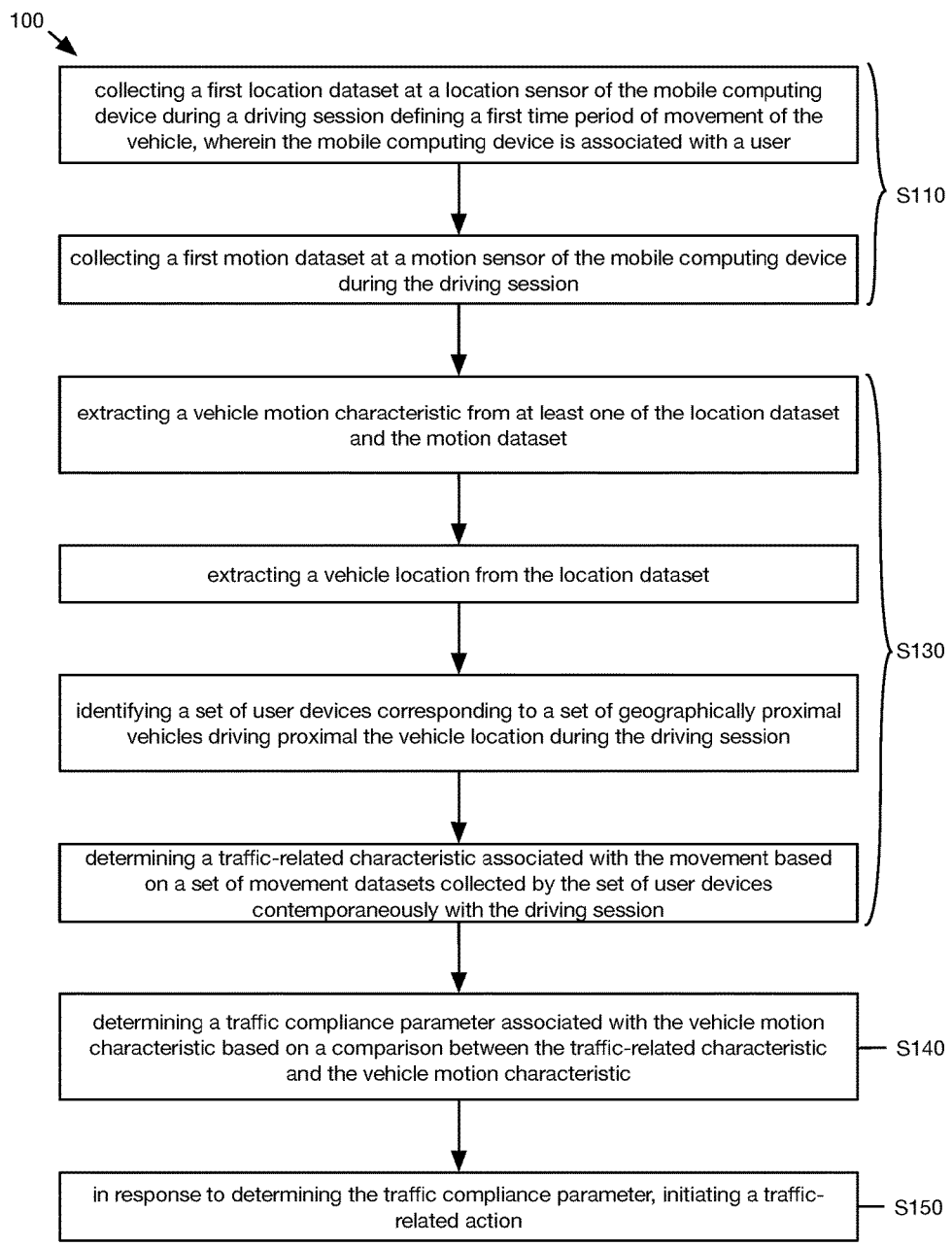
FIG. 5 depicts a flowchart representation of an example implementation of an embodiment of the method.

In a second specific example, as shown in FIG. 5, the method 100 includes collecting a first location dataset at a location sensor of the mobile computing device during a driving session defining a first time period of movement of the vehicle, wherein the mobile computing device is associated with a user; collecting a first motion dataset at a motion sensor of the mobile computing device during the driving session; extracting a vehicle motion characteristic from at least one of the location dataset and the motion dataset; extracting a vehicle location from the location dataset; identifying a set of user devices corresponding to a set of geographically proximal vehicles driving proximal the vehicle location during the driving session; determining a traffic-related characteristic associated with the movement based on a set of movement datasets collected by the set of user devices contemporaneously with the driving session; determining a traffic compliance parameter associated with the vehicle motion characteristic based on a comparison between the traffic-related characteristic and the vehicle motion characteristic; and in response to determining the traffic compliance parameter, initiating a traffic-related action.

The method 100 and/or system 200 of the embodiments can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a patient computer or mobile device, or any suitable combination thereof. Other systems and methods of the embodiments can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, though any suitable dedicated hardware device can (alternatively or additionally) execute the instructions.

The FIGURES illustrate the architecture, functionality and operation of possible implementations of systems, methods and computer program products according to preferred embodiments, example configurations, and variations thereof. In this regard, each block in the flowchart or block diagrams can represent a module, segment, step, or portion of code, which includes one or more executable instructions for implementing the specified logical function(s). It should also be noted that, in some alternative implementations, the functions noted in the block can occur out of the order noted in the FIGURES. As a person skilled in the art will recognize from the previous detailed description and from the figures and claims, modifications and changes can be made to the embodiments of the invention without departing from the scope of this invention as defined in the following claims. The embodiments include every combination and permutation of the various system components and the various method processes, including any variations, examples, and specific examples.

We claim:

1. A method for traffic compliance characterization with a mobile computing device located within a vehicle, comprising:
   collecting a first location dataset at a GPS sensor of the mobile computing device during a driving session defining a first time period of movement of the vehicle, wherein the mobile computing device is associated with a user;
   collecting a first motion dataset at an accelerometer of the mobile computing device during the driving session;
   extracting a vehicle motion characteristic from at least one of the location dataset and the motion dataset;
   extracting a vehicle location from the location dataset;
   inferring a traffic law associated with the vehicle location based on a set of historical movement datasets collected at a set of mobile computing devices associated with historical driving sessions intersecting the vehicle location, wherein the historical driving sessions occur before the first time period; wherein inferring the traffic law is performed at a remote computing system in communication with the mobile computing device;
   receiving the inferred traffic law at the mobile computing device contemporaneously with the driving session;
   at the mobile computing device, determining a traffic compliance parameter associated with the vehicle motion characteristic based on a comparison between the vehicle motion characteristic and the traffic law; and
   in response to determining the traffic compliance parameter, initiating a traffic-related action.

2. The method of claim 1, wherein the traffic compliance parameter indicates the vehicle motion characteristic as noncompliant with the traffic law, and wherein the traffic-related action comprises generating a notification indicative of noncompliance and a corrective driver action, and providing the notification to the user at the mobile computing device.

3. The method of claim 2, wherein providing the notification to the user comprises rendering the notification at a display of the mobile computing device.

4. The method of claim 1, wherein the traffic-related action comprises storing the traffic compliance parameter in association with a user account of the user at the remote computing system.

5. The method of claim 1, wherein the traffic-related action comprises transmitting the traffic compliance parameter to an insurance entity associated with the user.

6. The method of claim 1, wherein the vehicle motion characteristic comprises a vehicle speed, wherein the traffic law comprises a speed limit, wherein comparing the vehicle motion characteristic to the traffic law comprises comparing the vehicle speed to the speed limit, and further comprising determining a risk parameter based on comparing the vehicle speed to the speed limit.

7. The method of claim 1, further comprising:
   identifying a set of user devices corresponding to a set of secondary vehicles driving proximal the vehicle location during the driving session;
   determining a traffic-related characteristic associated with the movement based on a set of proximal movement datasets collected by the set of user devices contemporaneously with the driving session; and
   wherein determining the traffic compliance parameter is based on a comparison between the traffic-related characteristic and the vehicle motion characteristic in combination with the comparison between the vehicle motion characteristic and the traffic law.

8. The method of claim 1, further comprising:
   collecting an image dataset at an image sensor of the mobile computing device, wherein the image sensor of the mobile computing device is arranged within the vehicle to image a spatial region forward of the vehicle;
   extracting a visual traffic indicator from the image dataset;
   validating the traffic law based on the visual traffic indicator at the mobile computing device;
   determining the traffic compliance parameter in response to validating the traffic law; and
   updating a traffic map stored at the remote computing system based on validating the traffic law.

9. The method of claim 1, further comprising:
   determining an indicator type associated with a visual traffic indicator, based on the vehicle motion characteristic, wherein the vehicle motion characteristic characterizes a vehicle interaction with the visual traffic indicator;
   associating the indicator type with the vehicle location; and
   storing the indicator type in association with the vehicle location at a traffic map stored at the remote computing system.

10. The method of claim 1, wherein the traffic law defines a prohibition against executing a first traffic maneuver at the vehicle location, wherein determining the vehicle motion characteristic comprises determining a second traffic maneuver executed by the vehicle during the driving session at the vehicle location, and wherein determining the traffic compliance parameter is based on a comparison between the first traffic maneuver and the second traffic maneuver.

11. The method of claim 10, further comprising determining a time of day corresponding to the second traffic maneuver, wherein the traffic law defines a prohibition against executing the first traffic maneuver at the vehicle location between a first time of day and a second time of day, and wherein determining the traffic compliance parameter is based on determining that the time of day is between the first time of day and the second time of day.

12. A method for traffic compliance characterization with a mobile computing device located within a vehicle, comprising:
   collecting a first location dataset at a GPS sensor of the mobile computing device during a driving session defining a first time period of movement of the vehicle, wherein the mobile computing device is associated with a user;
   collecting a first motion dataset at an accelerometer of the mobile computing device during the driving session;
   extracting a vehicle motion characteristic from at least one of the location dataset and the motion dataset;
   extracting a vehicle location from the location dataset;
   identifying a set of user devices corresponding to a set of geographically proximal vehicles driving proximal the vehicle location during the driving session;
   determining a traffic-related characteristic associated with the movement based on a set of movement datasets collected by the set of user devices contemporaneously with the driving session, wherein each of the set of movement datasets comprises a corresponding location dataset collected at a GPS sensor at a corresponding user device of the set of user devices and a corresponding motion dataset at a corresponding accelerometer of the corresponding user device;
   determining a traffic compliance parameter associated with the vehicle motion characteristic based on a comparison between the traffic-related characteristic and the vehicle motion characteristic; and
   in response to determining the traffic compliance parameter, initiating a traffic-related action.

13. The method of claim 12, wherein the vehicle motion characteristic comprises a current vehicle speed, wherein the traffic-related characteristic comprises an average vehicle speed derived from the set of movement datasets collected by the set of user devices, and further comprising determining the traffic compliance parameter based on comparing the current vehicle speed to the average vehicle speed, and initiating the traffic-related action based on the traffic compliance parameter.

14. The method of claim 13, wherein the traffic-related action comprises storing the traffic compliance parameter in association with a user account of the user at a remote computing system.

15. The method of claim 12, further comprising predicting, at a processor of the mobile computing device, a traffic law associated with the vehicle location, based on the set of movement datasets collected by the set of user devices associated with the set of geographically proximal vehicles.

16. The method of claim 15, further comprising storing the predicted traffic law in association with the vehicle location at a remote computing system in communication with the mobile computing device.

17. The method of claim 16, further comprising:
   determining an indicator type associated with a visual traffic indicator, based on the vehicle motion characteristic, wherein the vehicle motion characteristic characterizes a vehicle interaction with the visual traffic indicator;
   associating the indicator type with the vehicle location; and
   storing the indicator type in association with the vehicle location at a traffic map stored at the remote computing system.

18. The method of claim 12, wherein the traffic-related characteristic defines a first traffic maneuver at the vehicle location, wherein determining the vehicle motion characteristic comprises determining a second traffic maneuver executed by the vehicle during the driving session at the vehicle location, and wherein determining the traffic compliance parameter is based on a comparison between the first traffic maneuver and the second traffic maneuver.

19. The method of claim 12, further comprising:
   inferring a traffic law associated with the vehicle location based on a set of historical motion datasets collected at a set of mobile computing devices associated with historical driving sessions intersecting the vehicle location, wherein the historical driving sessions occur before the first time period; wherein inferring the traffic law is performed at a remote computing system in communication with the mobile computing device;
   receiving the inferred traffic law at the mobile computing device contemporaneously with the driving session; and
   determining the traffic compliance parameter based on a comparison between the vehicle motion characteristic and the traffic law performed at the mobile computing device in combination with the comparison between the traffic-related characteristic and the vehicle motion characteristic.

20. The method of claim 19, further comprising determining a risk parameter based on the traffic compliance parameter, and associating the risk parameter with a user account of the user at the remote computing system.

* * * * *